United States Patent [19]
Nguyen et al.

[11] Patent Number: 5,920,692
[45] Date of Patent: Jul. 6, 1999

[54] METHOD AND SYSTEM FOR A REMOTE NOTIFICATION SERVICE FOR A MULTI-USER SERVER ARCHITECTURE

[75] Inventors: Binh Q. Nguyen; Richard J. Redpath, both of Cary; Sandeep Kishan Singhal, Raleigh, all of N.C.

[73] Assignee: International Business Machines Corp., Armonk, N.Y.

[21] Appl. No.: 08/823,272

[22] Filed: Mar. 24, 1997

[51] Int. Cl.⁶ .............................. G06F 13/42; G06F 15/16
[52] U.S. Cl. ................................ 395/200.34; 395/200.3; 395/200.6
[58] Field of Search ........................... 395/200.3, 200.49, 395/200.8, 200.58, 200.6, 703, 800.28, 800.29, 200.34, 200.35, 200.54; 463/42

[56] References Cited

U.S. PATENT DOCUMENTS

| | | | |
|---|---|---|---|
| 5,206,934 | 4/1993 | Naef, III ................................... | 395/200 |
| 5,355,484 | 10/1994 | Record et al. ........................... | 395/650 |
| 5,408,600 | 4/1995 | Garfinkel et al. ....................... | 395/153 |
| 5,517,606 | 5/1996 | Matheny et al. ........................ | 395/156 |
| 5,592,664 | 1/1997 | Starkey .................................... | 395/600 |
| 5,687,317 | 11/1997 | Hughes et al. ...................... | 395/200.03 |
| 5,721,825 | 2/1998 | Lawson et al. ..................... | 395/200.33 |
| 5,809,235 | 9/1998 | Sharma et al. ..................... | 395/200.54 |

OTHER PUBLICATIONS

Petersen, Scot, "Visigenic eases the way into nets for JAVA/ActiveX", PC Week, vol. 13 No. 44, p.14, Nov. 4, 1996.
Holub, Allen, "Hide your data and make objects responsible for their own user interfaces", Microsoft Systems Journal, vol.11 No.8, p.53, Aug. 1996.
Baum, David, "Data warehousing: Managing more with less", Data Based Advisor, vol.14 No.9, p.66, Sep. 1996.

*Primary Examiner*—Frank J. Asta
*Assistant Examiner*—Almari Romero
*Attorney, Agent, or Firm*—A. Bruce Clay

[57] ABSTRACT

An optimized design for a multi-user server architecture for disseminating a variety of real-time application data, such as audio, video, text and motion, while supporting general purpose tools. A general server system without an imposed GUI enables the end purchaser to customize the user interface as well as execute tools to monitor and control the operation of the system.

15 Claims, 5 Drawing Sheets

FIG.4

| EVENT | INTERFACE | DESCRIPTION |
|---|---|---|
| NEWWORLDOBJECT, DELETEWORLDOBJECT | WORLDOBJECTLISTENER | AN OBJECT HAS BEEN PLACED IN OR REMOVED FROM VIRTUAL WORLD |
| HEARTBEAT5 | HEARTBEAT5LISTENER | WAKE UP EVERY 5 SECONDS |
| HEARTBEAT30 | HEARTBEAT30LISTENER | WAKE UP EVERY 30 SECONDS |
| HEARTBEAT60 | HEARTBEAT60LISTENER | WAKE UP EVERY 60 SECONDS |
| PACKETRECEIVED, PACKETSENT | UDPPEERPACKETLISTENER | A UDP PACKET HAS BEEN RECEIVED OR SENT |
| PACKETSPROCESSED | UDPPEERPACKET PROCESSED LISTENER | A UDP PACKET HAS BEEN PROCESSED |
| PACKETSPROCESSED | PEERPACKET PROCESSEDLISTENER | A STREAM PACKET HAS BEEN PROCESSED (INCLUDING UDP PACKETS) |

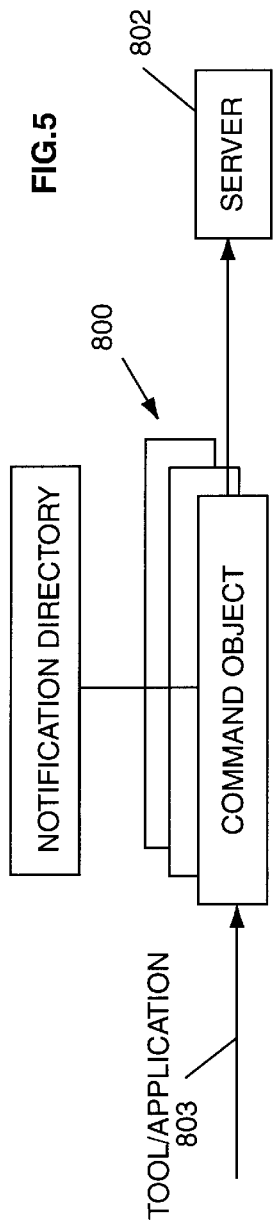

FIG.5

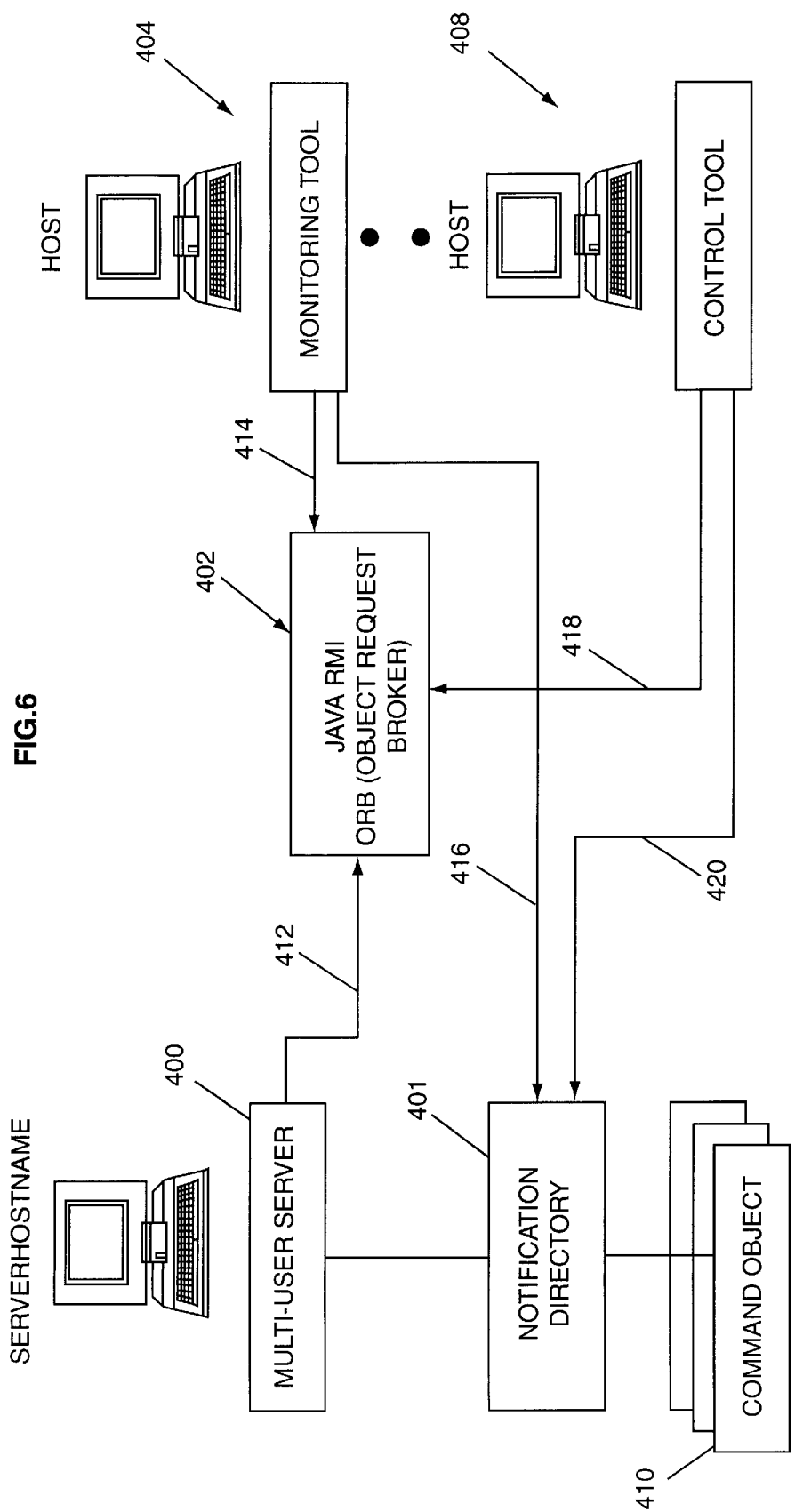

5,920,692

METHOD AND SYSTEM FOR A REMOTE NOTIFICATION SERVICE FOR A MULTI-USER SERVER ARCHITECTURE

FIELD OF THE INVENTION

This invention relates in general to computer software, and in particular to a method and system for remote notification services for a multi-user server architecture.

BACKGROUND OF THE INVENTION

Multi-user applications such as chat rooms (voice/text), virtual worlds, and adventure games such as Multi-User Dungeon (MUDs) generally employ proprietary client-server technologies. To turn Web sites into communities that are accessible and offer immersive experiences for the end-user, designers have developed customized browsers, servers, and tightly integrated development, debugging, and monitoring tools. In particular, each system has its own architectural design and intimate GUI. There is currently no standard system that can be employed to provide general purpose services and tools without tightly integrating with a particular browser/server implementation.

Several companies provide proprietary services today on the Internet. These prior art systems are monolithic, with a fixed concept of available services. Consequently, changing these services (i.e., tools and GUI) typically requires that the server source code be modified and, at a minimum, that the server environment be stopped and then restarted. Such prior art systems include, for example, the Run-Time Infrastructure (RTI) for the High-Level Architecture (HLA) for Defense Simulations, as published by the Defense Modeling and Simulation Office (DMSO). The result is one large and complex API which is very focused, i.e., all or nothing.

SUMMARY OF THE INVENTION

The present invention relates to a method and system for designing an optimized multi-user server architecture for disseminating a variety of real-time application data, such as audio, video, text and motion, while supporting general-purpose tools including an externally supplied GUI. The present invention allows the idea of providing a server system that enables the end purchaser to write a custom user interface, develop new external tools, and reuse existing tools. Finally, the present invention allows these tools and GUI to be started and stopped without interrupting the server's execution.

Under this design, the server registers a set of event notification interfaces with a public name server. Software tools locate these notification interfaces, register themselves with these notifiers, and operate by receiving events generated by the server. Through a similarly accessed command interface, software tools can initiate commands or operations on the running server. In this way, tools can be executed independently of the server, even on remote machines across a network.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 4 is a table illustrating a list of Multi-User Server system-wide events in accordance with the present invention;

FIG. 5 illustrates Command Objects in accordance with the present invention;

FIG. 6 illustrates the integration of the Notification Directory and Command Objects with an Object Request Broker (ORB) in accordance with the present invention.

DETAILED DESCRIPTION OF THE INVENTION

Figure 1:
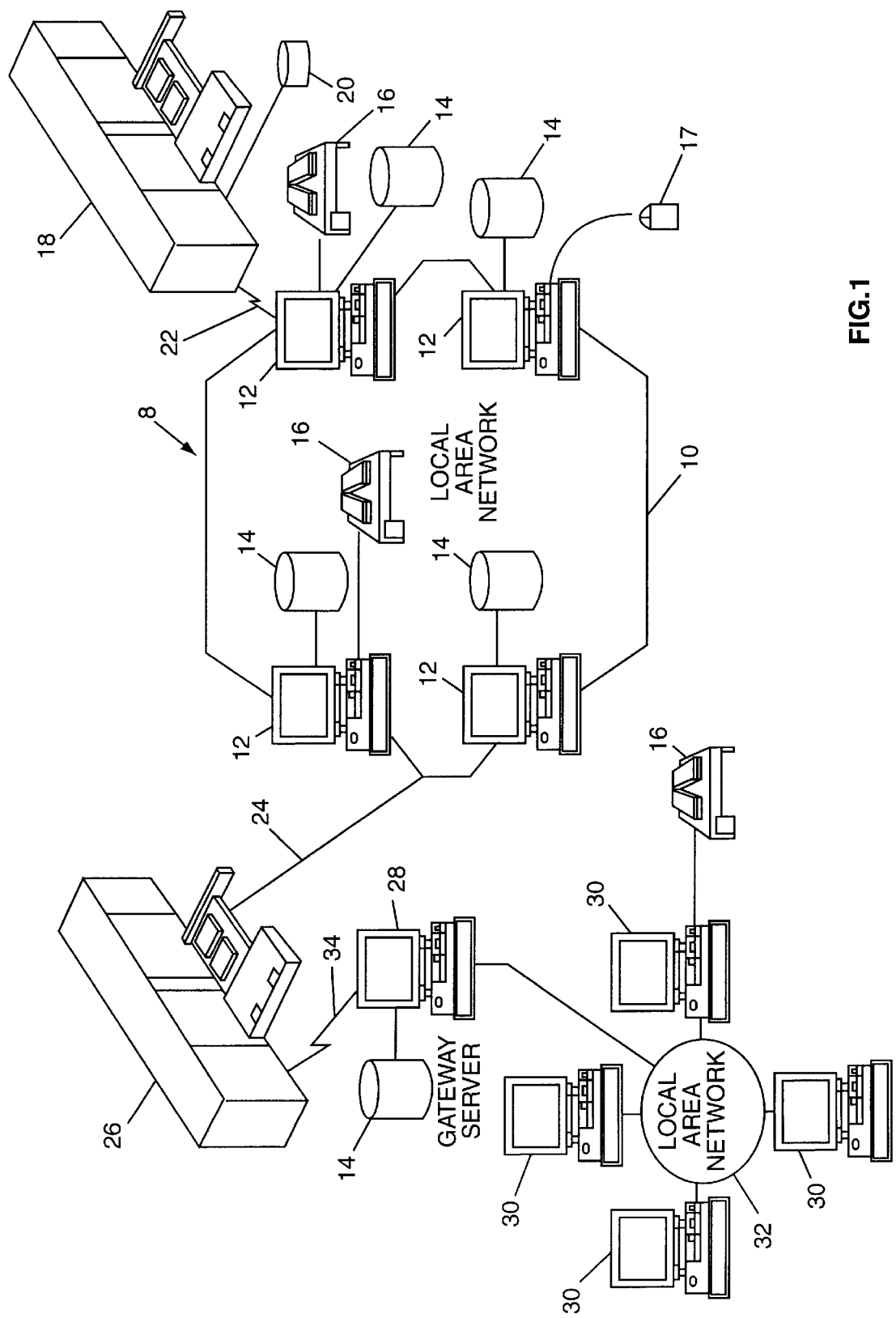
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
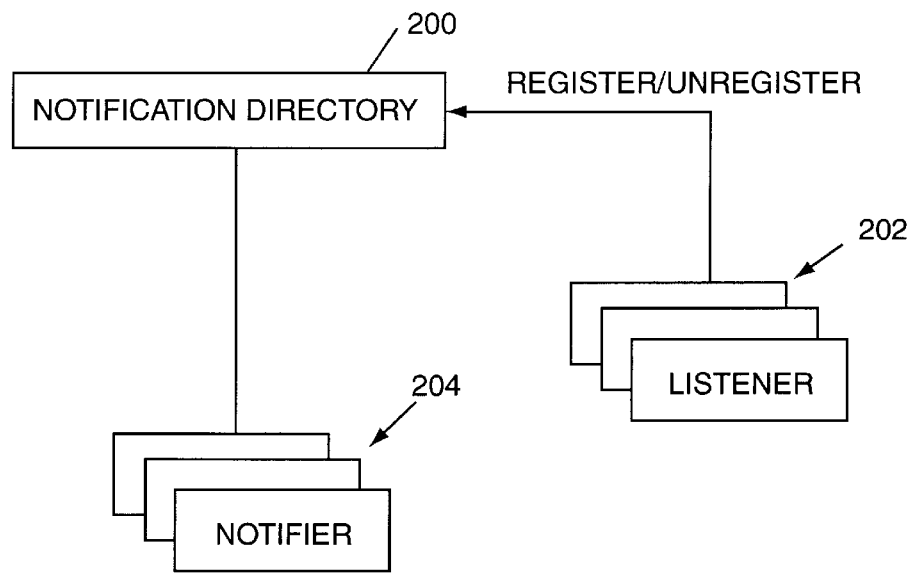
FIG. 2 is a diagram illustrating a Notification Directory in accordance with the present invention.

Referring to FIG. 2, to encapsulate the ability to provide information to the GUI and provide other external tools, a general notification service is provided through a Notification Directory 200. The Notification Directory 200 is an object which exposes an interface through which software agents may register or unregister their interest in various server events by providing an object implementing a particular Listener interface. Each Listener interface allows one object to call into another by defining a set of well-known methods. For example, the Java Bean event framework [SUN96] provides a standard structure for defining such event interfaces in the Java programming language. The Notification Directory 200 maintains a set of Notifier 204 objects. For each Listener interface type, a Notifier 204 manages a list of Listener 202 objects that have been registered through the Notification Directory. When a Listener 202 registers with the Notification Directory 200, it is added to the list maintained by the Notifier 204 for the associated Listener type.

Figure 3:
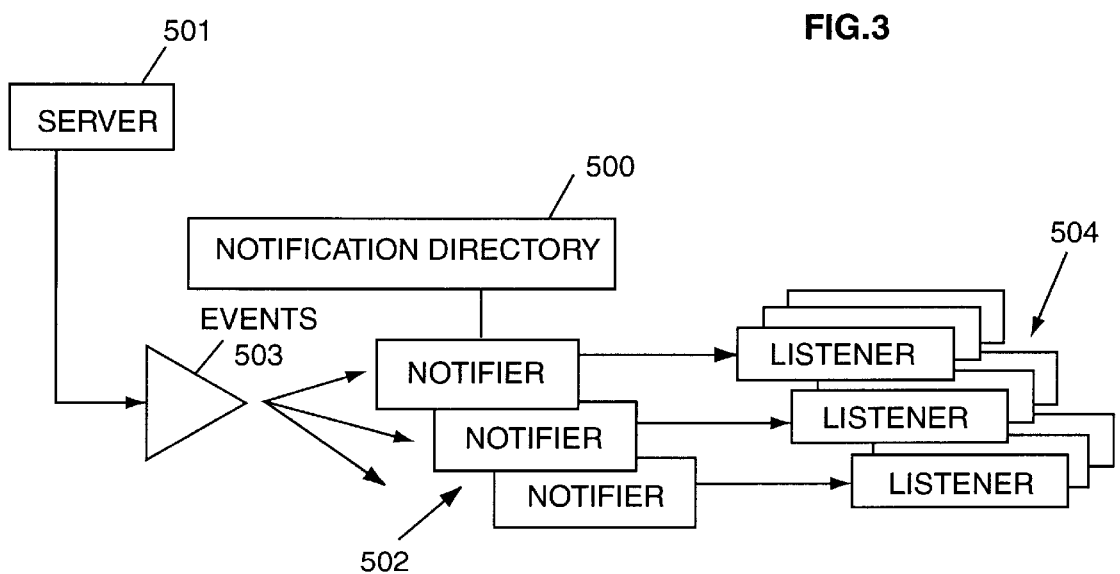
FIG. 3 illustrates how the Multi-User Server delivers events to Listener objects in accordance with the present invention.

FIG. 3 illustrates the procedure by which the Multi-User Server delivers events to a set of registered Listener objects. The server 501 software queries the Notification Directory 500 for the Notifier 502 corresponding to the Listener type for the event to be generated. The server 501 then delivers the event 503 to the Notifier 502. The Notifier 502, in turn, delivers the Event 503 to the particular Listener 504 object(s) that have been previously registered via the Notification Directory 500.

FIG. 4 illustrates one example of a list of Multi-User Server system-wide events. These notifications allow applications and tools to capture and respond to actions within the server environment. For example, a load monitor that measures packet rates, bandwidth utilization, latency, and data queuing delay can be implemented. Additional tools to provide statistics gathering and analysis and visualization of client-server network topology can be enabled through these notifications.

Referring to FIG. 5, to encapsulate the ability to control the Multi-User Server from the GUI and other external tools, one or more Command Objects 800 are provided by the server 802. A Command Object 800 is an object which exposes an interface through which software tools/applications 803 may execute commands or operations to control the server 802.

The remote notification and command capabilities are used herein to enable the aforementioned applications and tools to interoperate with a server running on a remote host. For example, these remote notifications and commands enable remote debugging and system management tools. As an extreme example, the server GUI is simply a tool that retrieves information through these exposed notifications and initiates operations on the server in response to user input.

The remote notification and command services enable external tools, applications, and GUIs to be started and stopped without shutting down the server. This feature is particularly powerful because it enables debugging and monitoring without interrupting existing users.

In the preferred embodiment of the present invention, the Multi-User Server registers the Notification Directory in the local Java RMI (Remote Method Invocation, SUN96) name server. Consequently, applications and tools can bind to a remote Notification Directory and, therefore, register to receive events dispatched from the Multi-User Server. This remote notification capability allows stand-alone, event-driven applications to integrate with the Multi-User system.

In the preferred embodiment of the present invention, applications and tools can invoke methods provided by the Notification Directory to access Command Objects, and, therefore, initiate commands and operations on the Multi-User Server.

Referring to FIG. 6, the solution is as follows:
1) A Multi-User Server 400 registers its Notification Directory 401 services with a local ORB (object request broker) 402. For example, using Java RMI, as indicated by line 412:
    java.rmi.Naming.rebind("rmi://serverhostname/services", notificationDirectory);

This enables remote applications to query and call the event registration/unregistration services and obtain references to the Command Objects.
2) A Monitoring Tool 404 or Control Tool 408 looks up the server Notification Directory 401 services via the ORB 402. For example, using Java RMI, as indicated by lines 414 and 418:
    NotificationDirectory notificationDirectory= (NotificationDirectory)java.rmi.Naming.lookup ("rmi://serverhostname/services");
3) The Monitoring Tool 404 registers the events it is interested in by supplying appropriate Listener objects. For example, using Java, as indicated by line 416:
    notificationDirectory.registerUserChanged (userChangedListener);

The Multi-User Server 400 then sends events to Monitoring Tools, as exemplified by Monitoring Tool 404. Therefore, the monitoring tools do not need to run in the same address space as the Multi-User Server 400. In fact, monitoring tools may run on a separate physical machine.
4) A Control Tool 408 queries the Notification Directory 401 to obtain a reference to a Command Object 410. The tool can then initiate commands and operations on the Multi-User Server. For example, in Java, as indicated by line 420:
    CommandObject commandObject= notificationDirectory.getCommandObject( );
    commandObject.performCommand( );

The ORB instructions for providing a port connection to the Multi-User Server, Notification Directory, or Command Objects is not claimed as the unique aspect for this disclosure, as remote object services are well-established in the prior art.

Figure 7:
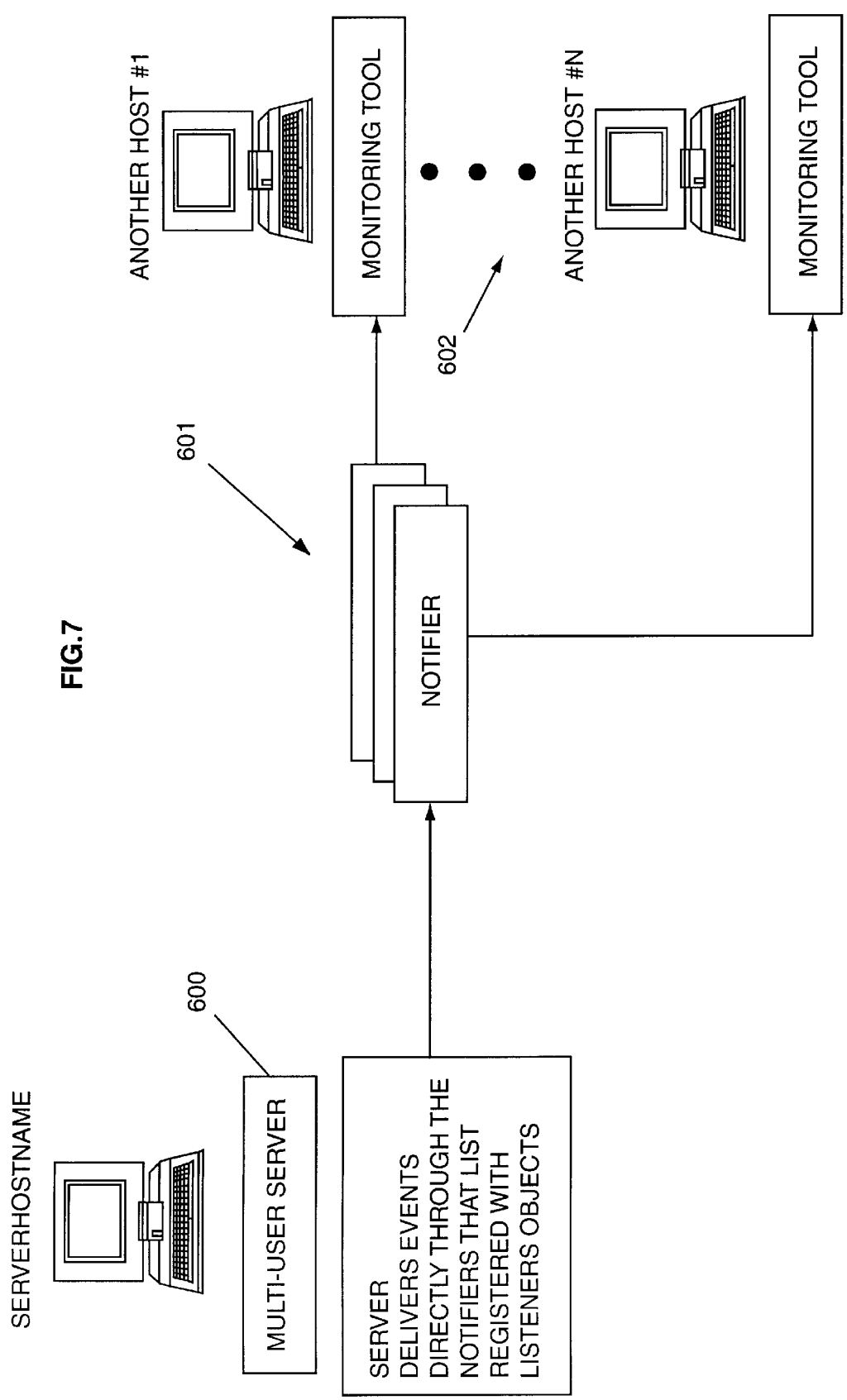
FIG. 7 illustrates the delivery of Multi-User Server events to remote clients in accordance with the present invention.

Referring next to FIG. 7, the Notifiers 601 maintain direct network object references corresponding to registered Listeners 602. As a result, the server 600 can deliver events to Listeners without accessing the ORB name services. Thus, the process of enabling direct delivery of events to Listeners is enabled for optimum efficiency.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of providing a remote notification service compatible with a plurality of listener interface types, comprising the steps of:

requesting registration of a listener having an associated one of the plurality of listener interface types and having an interest in notification of at least one event by requesting registration from a notification directory;

receiving at the notification directory the registration request of the listener;

associating the listener with a corresponding notifier object associated with the listener interface type of the listener so as to register the listener with the corresponding notifier object;

distributing notification of events having associated listener interface types to notifier objects corresponding to the listener interface types associated with the events; and wherein the notifier object provides notification of events to registered listeners utilizing the listener interface associated with the notifier object.

2. The method of claim 1, wherein said step of requesting registration further comprises:

providing a listener object to the notification directory containing at least one listener as a desired recipient of notification of said at least one event, wherein the listener object utilizes the associated one of the plurality of listener interface types.

3. The method of claim 2, further comprising:

receiving notification of said at least one event at said listener object.

4. The method of claim 1, further comprising the step of:

providing command objects for controlling a server to listeners registered with the notification directory so as to allow listeners registered with the notification directory to initiate commands on the server.

5. The method of claim 4, further comprising the steps of:

registering the notification directory with an object request broker so as to allow listeners to locate command objects;

locating a command object associated with the notification directory utilizing the object request broker; and initiating a remote command through said command object so as to control the server.

6. A system for providing a remote notification service compatible with a plurality of listener interface types, comprising:

means for requesting registration of a listener having an associated one of the plurality of listener interface types and having an interest in notification of at least one event by requesting registration from a notification directory; means for receiving at the notification directory the registration request of the listener;

means for associating the listener with a corresponding notifier object associated with the listener interface type of the listener so as to register the listener with the corresponding notifier object;

means for distributing notification of events having associated listener interface types to notifier objects corresponding to the listener interface types associated with the events; and wherein the notifier object provides notification of events to registered listeners utilizing the listener interface associated with the notifier object.

7. The system of claim 6, wherein said means for requesting registration further comprises:

means for providing a listener object to the notification directory containing at least one listener as a desired recipient of notification of said at least one event, wherein the listener object utilizes the associated one of the plurality of listener interface types.

8. The system of claim 7, further comprising:

means for receiving notification of said at least one event at said listener object.

9. The system of claim 6, further comprising:

means for providing command objects for controlling a server to listeners registered with the notification directory so as to allow listeners registered with the notification directory to initiate commands on the server.

10. The system of claim 9, further comprising:

means for registering the notification directory with an object request broker so as to allow listeners to locate command objects;

means for locating a command object associated with the notification directory utilizing the object request broker; and means for initiating a remote command through said command object so as to control the server.

11. A computer program product recorded on computer readable medium for providing a remote notification service compatible with plurality of listener interface types, comprising:

computer readable means for requesting registration of a listener having an associated one of the plurality of listener interface types and having an interest in notification of at least one event by requesting registration from a notification directory; means for receiving at the notification directory the registration request of the listener;

computer readable means for associating the listener with a corresponding notifier object associated with the listener interface type of the listener so as to register the listener with the corresponding notifier object;

computer readable means for distributing notification of events having associated listener interface types to notifier objects corresponding to the listener interface types associated with the events; and wherein the notifier object provides notification of events to registered listeners utilizing the listener interface associated with the notifier object.

12. The program product of claim 11, wherein said computer readable means for requesting registration further comprises:

computer readable means for providing a listener object to the notification directory containing at least one listener as a desired recipient of notification of said at least one event, wherein the listener object utilizes the associated one of the plurality of listener interface types.

13. The program product of claim 12, further comprising:

computer readable means for receiving notification of said at least one event at said listener object.

14. The program product of claim 11, further comprising:

computer readable means for providing command objects for controlling a server to listeners registered with the notification directory so as to allow listeners registered with the notification directory to initiate commands on the server.

15. The program product of claim 11, further comprising:

computer readable means for registering the notification directory with an object request broker so as to allow listeners to locate command objects;

computer readable means for locating a command object associated with the notification directory utilizing the object request broker; and computer readable means for initiating a remote command through said command object so as to control the server.

* * * * *